United States Patent Office 3,353,589
Patented Nov. 21, 1967

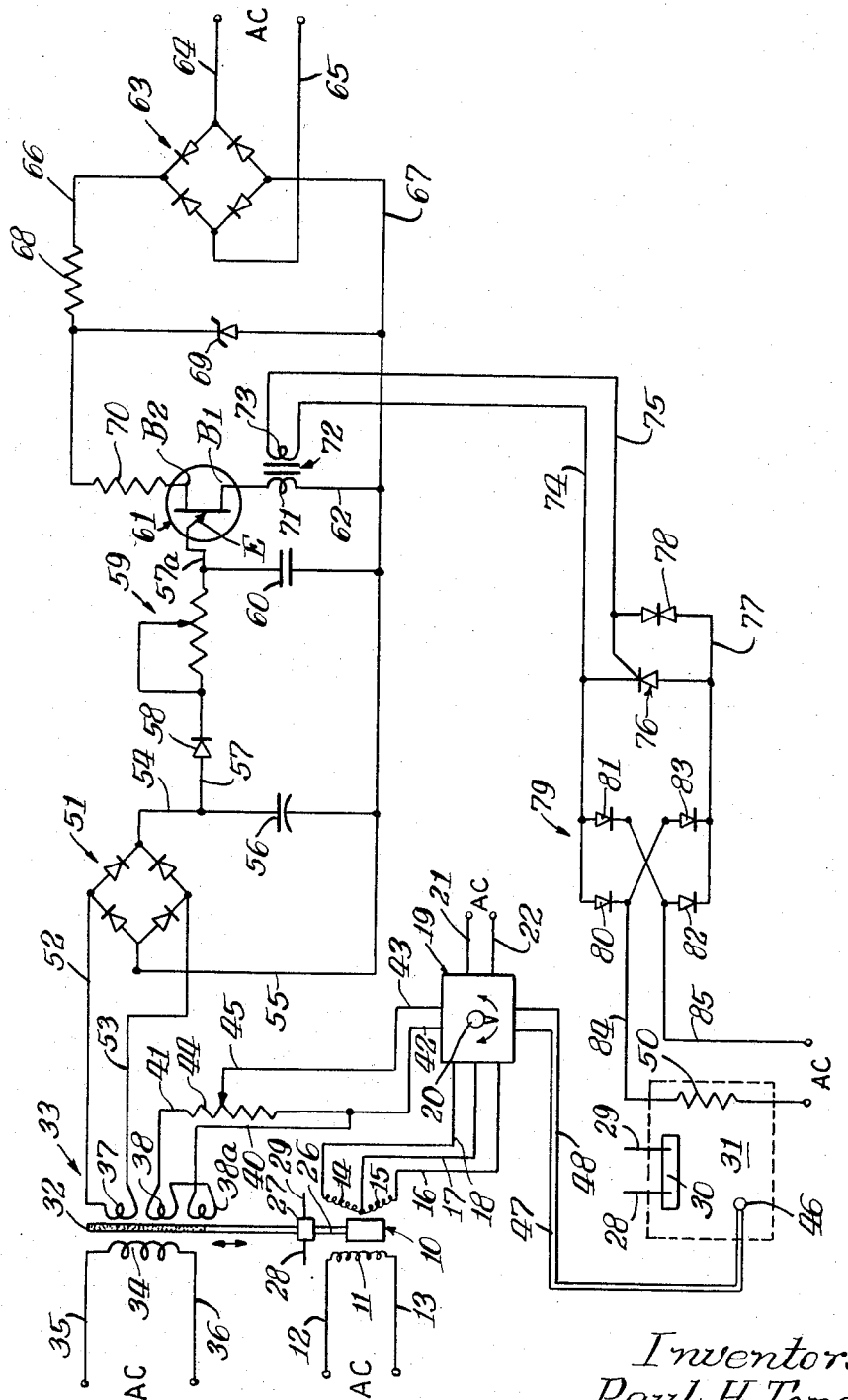

3,353,589
AUTOMATIC CONTROL CIRCUIT FOR REGULATING TEMPERATURE
Paul H. Tope, St. Joseph, Mich., and Burke J. Crane, Riverside, Ill., assignors to Whirlpool Corporation, a corporation of Delaware
Filed Oct. 22, 1965, Ser. No. 501,833
11 Claims. (Cl. 165—26)

ABSTRACT OF THE DISCLOSURE

A control system employing solid state circuits and a mechanical refrigerant valve for controlling or regulating refrigeration and heating means for maintaining a predetermined temperature in a space.

Specification

This invention relates to control means, and more particularly to control means for regulating apparatus which controls the temperature of a space.

In co-pending application Ser. No. 445,568 of Tope et al., assigned to the same assignee hereof, a refrigeration system is disclosed wherein a compressor provides refrigerant fluid through a condenser to an evaporator wherein refrigeration is effected in a space, or zone, as a result of the evaporation of the refrigerant fluid therein. The Tope et al. application further discloses an apparatus for regulating the refrigeration system to maintain a substantially constant or "straight line" temperature control within the space to be refrigerated. The present application comprehends a novel control system for regulating apparatus somewhat similar to that disclosed in the Tope et al. application.

Briefly, in the Tope et al. application structure, a modulating valve converts rotary motion of an electric motor into translatory movement of a refrigerant flow control member. Means is provided for sensing the temperature in the zone to be controlled, and further adjustable means is provided for selecting a desired temperature within the zone. Differential transformer means is associated with the modulating valve mentioned above, to produce signals which are proportionate to the valve position and the resulting amount of refrigerant flowing through the valve. Heating means is provided in the controlled zone to impart heat thereto when a decrease in the flow of refrigerant to the evaporator is insufficient to allow the said heat load in the zone to raise the temperature to the desired level. The operation of the heating means, as well as the modulation of the refrigerant flow, is controlled by a signal produced by the differential transformer, which signal corresponds to the relative position of an iron core associated with the modulating valve with respect to the differential transformer.

Thus, when the temperature in the controlled zone is above the desired temperature the modulating valve causes an increase in refrigerant flow to the evaporator to lower the temperature within the controlled zone. When the temperature in the controlled zone is below the desired temperature, the modulating valve decreases the refrigerant flow to the evaporator to allow the temperature within the controlled zone to rise. If the temperature within the controlled zone does not rise to the desired level by reducing the amount of refrigerant flowing to the evaporator, the heater within the controlled zone is energized to bring the temperature therein up to the desired level.

A feature of the present invention is the provision of a suitable control system for operating the apparatus discussed above in the desired manner.

Another feature of the invention is the provision of a control system which is operatively responsive to the difference between the temperature in a zone and a preselected temperature to quickly and economically change the zone temperature to the preselected temperature.

A further feature of the invention is the provision of an electrical circuit for a control system of the type described above, said circuit containing a novel arrangement of electrical components for operating the system in the desired manner.

Still another feature of the invention is the provision of pulse generating means in the circuit mentioned in the preceding paragraph for controlling the energization of an electrical heating device in the controlled zone.

A still further feature of the invention is the provision of a control circuit as mentioned above wherein the pulse generating means is operatively responsive to an increase in voltage thereacross, said increase in voltage corresponding to a demand for heat in the controlled zone to bring the temperature therein up to a preselected level.

Yet another feature of the invention is to connect pulse actuated conducting means between the above-mentioned heater and pulse generating means for energizing the heater upon a pulse from said generating means.

Other features and advantages will be apparent from the following description taken in connection with the drawing wherein the single view is a schematic diagram of the control circuit.

In the exemplary embodiment of the invention as disclosed in the drawing, a reversible motor 10 includes a field winding 11 connected to a first A.C. source of power through lines 12 and 13, and control windings 14 and 15 connected to a controller 19 through lines 16, 17 and 18. Control windings 14 and 15 determine the direction of rotation of motor 10. When control winding 14 is energized, motor 10 is operated in a direction to cause more refrigeration and/or less heat to be supplied to controlled zone. When control winding 15 is energized, motor 10 is operated in a direction to cause less refrigeration and/or more heat to be supplied to the controlled zone.

Controller 19 is preferably a conventional balanced temperature sensing control of the type available from Minneapolis Honeywell Company under their catalogue No. R7087D. Controller 19 includes means for preselecting the desired temperature in the controlled zone and is illustrated by a control knob 20 which may be rotated to the desired setting. Certain embodiments of controller 19 require a separate power source, which is illustrated by lines 21 and 22 connected to a second A.C. source of power.

As is disclosed more fully in the above-mentioned Tope et al. application, motor 10 includes a threaded output shaft 26 that is threaded into a valve stem of a modulating valve 27 to convert rotary movement of shaft 26 into translatory movement of the valve stem. Valve 27 serves to regulate the quantity of refrigerant flowing through it and refrigerant lines 28 and 29 to an evaporator 30 within a controlled zone 31. A core 32 (preferably of soft iron) is provided at the outer end of the valve stem, and is movable into and out of coupling relationship with a differential transformer 33. Transformer 33 includes a primary coil 34 connected to at hird A.C. power source by lines 35 and 36. The secondary winding of transformer 33 comprise a first and second coils 37 and 38. Coil 38 has a portion 38a which is positioned and wound to produce a voltage which opposes the voltage induced in coil 38 so the combined output of coils 38 and 38a has a near linear relationship between the position of iron core 32 and their combined output voltages.

Coils 38 and 38a are connected to signal divider resistor 44 by lines 40 and 41. Adjustable means 45 is provided to permit tapping a portion of a voltage signal from resistor 44 for use in controller 19. This signal is connected to controller 19 by lines 42 and 43. Resistor 44 with adjustable means 45 provides the sensitivity adjustment for the entire control system, as it determines the portion of the valve position feedback signal which is transmitted to controller 19.

The temperature in zone 31 is sensed by a standard type temperature responsive device 46 which is connected by lines 47 and 48 to controller 19. Thermoresponsive device 46 may comprise any suitable device for providing a voltage or current signal to controller 19 as a function of the temperature within the zone 31, and for any preferred arrangement comprises a thermistor. The signal induced in coils 38 and 38a is a function of the position of iron core 32 with respect to coils 34, 38 and 38a, which also indicates the position of valve 27 and the amount of refrigerant flowing therethrough. Thus, controller 19 provides a means for comparing a first signal from the secondary of transformer 33 to a second signal from temperature sensing device 46.

The motor 10 will be energized, when and in the direction required, to drive the refrigerant valve 27 and iron core 32 to the proper position to restore controller 19 to a balanced condition. Controller 19 is restored to a balanced condition by feedback signals from the coils 38 and 38a, from differential transformer 33 and the tempearture responsive device 46, and the signal of the preselected temperature. The refrigerant valve and heating element control are sequenced to provide maximum refrigerant flow at one extreme of valve travel and maximum electrical heating at the other extreme. As the valve is moved from the maximum refrigerant flow position to the maximum heating position, the refrigerant flow is modulated to a minimum determined by valve leakage. The heating is modulated from zero to maximum. If desired, there can be an overlap or a dead zone between the positions where minimum refrigerant flow is established and the position where heating modulation starts.

An example of the systems operation is as follows. When the temperature within zone 31 is above the preselected tempreature as determined by controller 19, the signals from coils 38 and 38a and temperature sensing device 46 are compared by controller 19, which causes control winding 14 to become energized to operate motor 10 and move the stem of modulating valve 27 and iron core 32 in a direction to increase the amount of refrigerant flowing and/or decrease the amount of heat provided to zone 31. Conversely, when the temperature within zone 31 drops below the preselected temperature determined by controller 19, the signals from coils 38 and 38a and temperature sensing device 46 are compared by controller 19, which causes control winding 15 to become energized, to operate motor 10 and move the stem of valve 27 and iron core 32 in the other direction to decrease the amount of refrigerant flowing and/or increase the amount of heat provided to zone 31. Iron core 32 will continue to be moved in the appropriate direction until a balanced condition is reached in controller 19, between the preset temperature signal, and the signals from coils 38 and 38a and from temperature sensing device 46. Heating means 50 is provided in zone 31 for heating the same when the decrease in refrigerant flow does not allow the temperature within zone 31 to rise to the preselected level.

Electrical circuit means is provided for energizing heater 50 and the circuit means is connected by lines 52 and 53 to secondary coil 37 of transformer 33. A full wave rectifying bridge 51 is connected across lines 52 and 53 and converts the voltage induced in coil 37 from an A.C. signal to a pulsating D.C. signal at the output of rectifier bridge 51, which is connected to lines 54 and 55. A capacitor 56 is connected across bridge 51 output, lines 54 and 55 to filter the pulsating D.C. signal. Thus, when iron core 32 moves into coupling relationship with secondary coil 37 of transformer 33, direct current flows in lines 55 and 57 (connected to line 54). A blocking diode 58 and a potentiometer 59 are provided in line 57. Line 57a connects potentiometer 59 to the emitter E of unijunction transistor 61. A capacitor 60 is connected between lines 55 and 57a and the voltage impressed thereacross will cause capacitor 60 to become charged. Unijunction transistor 61 and a pulse transformer 72 are connected across lines 55 and 57a by a line 62.

Another full wave rectifying bridge 63 is connected to a fourth A.C. source of power by lines 64 and 65, and rectifying bridge 63 applies pulsating direct current to lines 66 and 67. a suitable resistor 68 is provided in line 66, and a Zener diode 69 is connected across lines 66 and 67 after resistor 68 to provide a constant voltage across the base electrodes B1 and B2 of unijunction transistor 61. As iron core 32 moves to reduce the refrigerant flow through modulating valve 27, the voltage induced in secondary coil 37 and impressed across lines 55 and 57 provides a charging voltage for the R.C. network of resistor 59 and capacitor 60. Capacitor 60 voltage is connected to emitter E or the control electrode of unijunction transistor 61. When the emitter voltage exceeds the intrinsic stand off ratio multiplied by the voltage across base electrodes B1 and B2 (determined by the Zener diode 69), unijunction transistor 61 will fire to produce a current pulse in line 62. A primary coil 71 of a transformer 72 is connected in line 62, and the current pulse created by unijunction transistor 61 induces a corresponding pulse in a secondary winding 73 of transformer 72. Secondary winding 73 is connected across the gate and cathode terminals of SCR 76 by lines 74 and 75 respectively. Lines 74 and 77 are connected to the output of SCR 76 (the cathode and anode terminals respectively).

SCR 76 will not conduct current to heater 50 until a pulse is received from unijunction transistor 61. A thyrector 78 is connected across lines 75 and 77 to protect SCR 76 from surge voltages. A full wave rectifier 79, consisting of diodes 80, 81, 82 and 83, is connected between lines 74 and 77, and by lines 84 and 85 to a fifth A.C. source of power to form a path for current flow of proper polarity to SCR 76. Heating element 50 is connected in line 84 and is preferably physically located within zone 31.

Thus, when a pulse from unijunction transistor 61 and through transformer 72 causes SCR 76 to fire, the current flows through SCR 76 for the remaining half cycle of the fifth A.C. source of power. When the voltage reaches zero, SCR 76 becomes non-conductive as is well known. For example, when line 85 is positive, current flows through diode 82, SCR 76, diode 80, line 84 and heater 50. When line 84 is positive, current flows through heater 50, line 84, diode 83, SCR 76, diode 81 and line 85. Thus, heater 50 will be energized for the remaining half cycle portions of the fifth A.C. source after SCR 76 is caused to become conductive by the pulse from unijunction transistor 61 and through transformer 72. Whenever the voltage impressed across the emitter to B1 of unijunction transistor 61 (as determined by the coupling between iron core 32 and the coil 37 and the time constant of R.C. network of resistor 59 and capacitor 60) exceeds during any half cycle the voltage across the base electrodes B1 and B2 times the intrinsic stand off ratio unijunction transistor 61 will fire to provide a pulse to make SCR 76 conductive. As long as the temperature within zone 31 remains below the preselected temperature, iron core 32 will move into greater coupling relationship with coil 37. This will cause an increase in voltage across the emitter of unijunction transistor 61, and the charge on capacitor 60 will increase. The increasing charge on capacitor 60 enables the triggering potential of unijunction transistor 61 to be reached sooner, causing SCR 76 to begin conduction during an earlier portion of the fifth A.C. source half cycle coupled thereto. This causes an increase in the amount of current conducted by SCR 76 and flowing through heater 50, and a corresponding increase in the amount of heat produced by heater 50 and imparted to zone 31.

Thus, controller 19 functions to compare signals from the temperature sensing device 46, the signal from coils 38 and 38a, and the preselected temperature setting and operates motor 10 to actuate modulating valve 27 in response to zone 31 temperature deviation from the preselected temperature. When the reduction in the quantity of refrigerant flowing to evaporator 30 is insufficient to permit the normal heat load of zone 31 to raise the temperature therein to the preselected level, motor 10 moves iron core 32 into coupling relationship with the secondary coil 37 of transformer 33 to fire unijunction transistor 61 to make SCR 76 conductive and energize heater 50. Thus, secondary coils 38 and 38a of transformer 33 defines a fixed range of movements for iron core 32 that controls modulating valve 27. Secondary coil 37 defines a second range of movements for iron core 32 which controls the output of heater 50. When heater 50 brings the temperature within zone 31 up to or slightly in excess of the preselected temperature, the imbalance sensed by controller 19 will reverse motor 10 to move iron core 32 out of coupling relationship with coil 37 and thereby stop the output of heater 50. If there is a constant heat loss from zone 31, modulating valve 27 will assume a position wherein the supply of refrigerant to evaporator 30 will balance the heat loss so the preselected temperature of zone 31 will be maintained in a straight line relationship.

While we have shown and described one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Apparatus for maintaining a zone at a preselected temperature comprising:
   means for changing the temperature in said zone including cooling means and heating means; means for sensing the temperature in said zone;
   electrical circuit means for effecting the operating of said cooling means and said heating means;
   means responsive to said sensing means for providing a voltage in said circuit means infinitely variable as a function of a deviation in the zone temperature below the preselected temperature;
   and semiconductor control means responsive to said variable voltage in said circuit for variably energizing said heating means as a direct function of the amount of said temperature variation.

2. The apparatus as provided in claim 1 wherein said semiconductor energizing control means includes means responsive to said variable voltage in said circuit means for providing a time variable pulse, and additional means responsive to said pulse for variably energizing said heating means.

3. The apparatus of claim 2 wherein said additional means includes pulse actuated gated current conducting means.

4. The apparatus of claim 3 wherein said pulse actuated conducting means is unidirectional and means are provided for energizing said heating means by alternating current, controlled by said conducting means.

5. The apparatus of claim 3 wherein inductive means is connected with said semiconductor means for applying said pulse to said pulse actuated conducting means.

6. Apparatus for controlling the temperature within a zone comprising:
   means for changing the temperature in said zone including, an electrical heater for raising the temperature in said zone, refrigeration means having a supply of refrigerant for lowering the temperature in said zone, and means for modulating the supply of refrigerant to said zone;
   electrical circuit means for energizing said heater; means for determining the actual temperature within said zone; means for selecting a desired temperature within said zone; means translatable through a first and second range of positions;
   means for infinitely adjustably translating said translatable means in accordance with a difference between the desired and actual temperature within said zone;
   means responsive to translation of said translatable means through said first range of positions for modulating said refrigerant supply;
   and means responsive to translation of said translatable means through said second range of positions for actuating said electrical circuit means to infinitely adjustably energize said heater as a function of the amount of said translation.

7. Apparatus for controlling the temperature within a zone comprising:
   means for changing the temperature in said zone including, a heater for raising the temperature in said zone, a supply of refrigerant for lowering the temperautre in said zone, and means for modulating the supply of refrigerant to said zone;
   electrical circuit means for energizing said heater; means for determining the actual temperature within said zone;
   means for selecting a desired temperature within said zone; translatable means through a first and second range of positions;
   means for translating said translatable means in response to a difference between the desired and actual temperature within said zone;
   means responsive to translation of said translatable means through said first range of positions for modulating said refrigerant supply; and
   means responsive to translation of said translatable means through said second range of positions for actuating said electrical circuit means to energize said heater, said actuating means including a transformer having primary and secondary winding means, and said translatable means including a core movable with respect to said winding means to provide a signal in said secondary winding means for operating said electrical circuit means to energize said heater.

8. The apparatus of claim 7 wherein said electrical circuit means is normally non-conductive to said heater and means are provided for making said electrical circuit conductive to said heater in response to said signal induced in said secondary winding as said core increases it coupling with said secondary winding.

9. The apparatus of claim 8 wherein said last named means includes a transistor means, connected in said electrical circuit, and having the signal induced in said secondary winding impressed thereacross.

10. The apparatus of claim 9 in which a pulse actuated conducting means is connected in said electrical circuit with said heater and said transistor means, and is adapted to be energized upon receiving a pulse from said transistor means.

11. Apparatus for controlling the temperature within a zone comprising:
   means for changing the temperature in said zone including, a heater for raising the temperature in said zone, a supply of refrigerant for lowering the temperature in said zone, and means for modulating the supply of refrigerant to said zone;
   electrical circuit means for tnergizing said heater;
   means for determining the actual temperature within said zone;

means for selecting a desired temperature within said zone;

translatable means through a first and second range of positions;

means for translating said translatable means in response to a difference between the desired and actual temperature within said zone;

means responsive to translation of said translatable means through said first range of positions for modulating said refrigerant supply; and means responsive to translation of said translatable means through said second range of positions for actuating said electrical circuit means to energize said heater, said actuating means including a transformer having primary and secondary winding means, and said translatable means including a core movable with respect to said winding means to provide a signal in said secondary winding means for operating said electric circuit means to energize said heater, and for operating said means for moving said translatable means to modulate said refrigerant supply.

References Cited
UNITED STATES PATENTS

| | | | |
|---|---|---|---|
| 2,420,539 | 5/1947 | Hornfeck | 236—78 |
| 3,069,612 | 12/1962 | Hamilton. | |
| 3,112,791 | 12/1963 | Brahm | 236—78 X |
| 3,161,782 | 12/1964 | Vieth | 165—26 X |

ROBERT A. O'LEARY, *Primary Examiner.*

M. A. ANTONAKAS, *Assistant Examiner.*